United States Patent [19]
Mizrahi-Shalom et al.

[11] Patent Number: 5,590,358
[45] Date of Patent: Dec. 31, 1996

[54] PROCESSOR WITH WORD-ALIGNED BRANCH TARGET IN A BYTE-ORIENTED INSTRUCTION SET

[75] Inventors: Ori K. Mizrahi-Shalom, San Jose; Kung-Ling Ko, Union City, both of Calif.

[73] Assignee: Philips Electronics North America Corporation, New York, N.Y.

[21] Appl. No.: 308,337

[22] Filed: Sep. 16, 1994

[51] Int. Cl.$^6$ ........................................... G06F 9/00
[52] U.S. Cl. ........................ 395/800; 395/380; 395/500
[58] Field of Search .................................. 395/800, 375, 395/700, 500

[56] References Cited

U.S. PATENT DOCUMENTS

| | | | |
|---|---|---|---|
| 4,338,663 | 7/1982 | Strecker et al. | 395/375 |
| 4,777,594 | 10/1988 | Jones et al. | 395/375 |
| 4,791,557 | 12/1988 | Angel et al. | 395/375 |
| 5,051,885 | 9/1991 | Yates, Jr. et al. | 395/375 |
| 5,249,273 | 9/1993 | Yoshitake et al. | 395/375 |
| 5,327,536 | 7/1994 | Suzuki | 395/375 |
| 5,335,332 | 8/1994 | Christopher, Jr. et al. | 395/425 |
| 5,381,532 | 1/1995 | Suzuki | 395/375 |

*Primary Examiner*—Mehmet B. Geckil
*Attorney, Agent, or Firm*—Debra Stephens

[57] ABSTRACT

A microcontroller or processor architecture that performs word aligned multi-byte fetches but allows byte aligned instructions. Jump target addresses are word aligned, resulting in a word aligned fetch of the jump-to instruction. An assembler or compiler loads code into an instruction memory with branch instruction target addresses aligned on word boundaries. Returns from interrupts load the program counter with a complete return address which is byte aligned.

11 Claims, 5 Drawing Sheets

PROCESSOR WITH WORD-ALIGNED BRANCH TARGET IN A BYTE-ORIENTED INSTRUCTION SET

BACKGROUND OF THE INVENTION

1. Field of the Invention

The present invention is directed to a processor or microcontroller in which scheduled changes in program flow, such as which is to occur due to a branch instruction, are to a target address aligned on a word boundary, variable size instructions can be aligned on a byte boundary and non-scheduled program flow changes, such as interrupt returns and returns from a procedure are to a byte aligned point and, more particularly, to a system in which instructions can be a selected number of bytes in length and are aligned on byte boundaries except when the instruction is at a target address of a branch instruction in which case it is aligned on a word boundary.

2. Description of the Related Art

Instruction sets for different processors define the permissible addresses of each data item or first byte of any instruction. Known processors can be divided into 2 categories: 1) Fully-aligned where the address can be only on specific boundaries, normally byte, word (for example, 2-bytes) or doubleword (for example, 4-bytes). These processors implement an instruction set with (binary) instruction size as a multiple of their alignment size. 2) Non-aligned where the address is not restricted to any size alignment, i.e., it could start at any (permissible) address granularity, normally at, but not necessarily limited to, any byte address.

One factor that is of interest for performance evaluation of processors or microcontrollers, is the way code is read from the memory system, including caching schemes, read-write memory and read-only memory. Due to the high-speed of internal execution and the resulting increased instruction bandwidth requirements of today's processors and microcontrollers, memories are commonly accessed through multi-byte buses (or data paths). The simplest way to handle the high-speed access and avoid unnecessary gate delays is to access the memory at a fixed alignment for each code or instruction read. This avoids a complex, post fetch alignment scheme at most (or all) levels of the system hierarchy. This approach is universally accepted in high-performance or multi-byte oriented processor implementations. It works particularly well for the fully-aligned architectures discussed above. For those processors which implement the non-aligned approach, code fetches after a branch to a non-aligned address usually take extra memory cycles (when the target instruction length crosses the aligned memory access boundary). This has a major drawback of slowing down the execution and degrading processor performance. There are several solutions to this problem, most of which implement some type of caching scheme, which is relatively expensive. The most desirable approach, for the simplicity of the code fetch and instruction alignment is the fully-aligned instruction set.

Another factor of interest in today's microcontrollers is code density. Each instruction has a quantifiable amount of information and requires a certain size to contain all the needed information. There are many ways to optimize the encoding of each instruction for a particular technology/architecture. In general, they follow a very simple rule: the most frequently used instructions should be as short as possible, cutting on bandwidth (dynamic code size) and code memory size (static code size) requirements. The impact of the encoding is influenced by many factors, but for the cost driven design this rule holds very well and tends to increase program code density. Following that rule may dictate variable size instructions, possibly at non-aligned addresses. For simple cost driven processor designs, the fully-aligned approach will increase code size slightly but increase performance due to the reduced branch penalty, while the non-aligned approach will reduce code size with a performance degradation.

What is needed is an optimal solution that takes advantage of the code packing density of the non-aligned architecture and of the fetch speed and simplicity of the fully aligned architecture.

SUMMARY OF THE INVENTION

It is an object of the present invention to provide a high code packing density and a fast fetch following scheduled branches.

It is another object of the present invention to allow instructions to be aligned on byte boundaries.

It is also an object of the present invention to align flow change target instructions, such as branch targets, on word boundaries where the size of a word is defined by the alignment and size of a memory read in the particular implementation.

It is a further object of the present invention to provide a processor that performs a single or a multibyte instruction or code fetch.

It is an additional object of the present invention to provide a larger branch target range for the program counter relative to branch instructions for a given offset size.

The above objects can be attained by a microcontroller architecture and compiler that performs unaligned multibyte fetches, jumps to word aligned branch addresses, allowing a word aligned fetch of the jump-to instruction and loads code into an instruction memory with branch instruction target addresses aligned on word boundaries.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

The present invention maximizes the throughput of word-size code for scheduled changes in program flow, such as occurs in branches, jumps and procedure calls. To do this the processor or microcontroller, instruction set and assembler or compiler (code generator) of the present invention aligns all flow change entry points, such as branch targets, on a word boundary and performs code fetches of multiple bytes, preferably, but not limited to, two bytes or a word, although multiple word fetches are possible. In this example a word is two bytes; however, depending on the system, a word may be a different size. This allows fast code fetches after a branch is taken. This architecture maximizes code density by allowing instructions to be aligned on any byte, fetches instructions in multibyte fetches and performs post fetch alignment in the fetch unit. The instruction size varies from one to seven bytes in length and is not restricted to the alignment and size of the multibyte fetch, also allowing high code density. Because the instructions can be fetched at byte boundaries but the branch targets are word boundary aligned, a larger target address range for branch target addresses is possible in the microcontroller with the same number of address bits because the target address need not carry the least significant bit that distinguishes between bytes and can instead carry an additional most significant bit. The microcontroller also supports unplanned changes in program flow, such as caused by exceptions and interrupts, at any byte address by storing the full return address on the stack when an interrupt or an exception occurs. The return instruction pops the full address from the stack, allowing program branch to a byte granularity address for these unscheduled interrupts and exceptions. Of course, returning into an odd address will usually be slower than returning into an even address.

Figure 1:
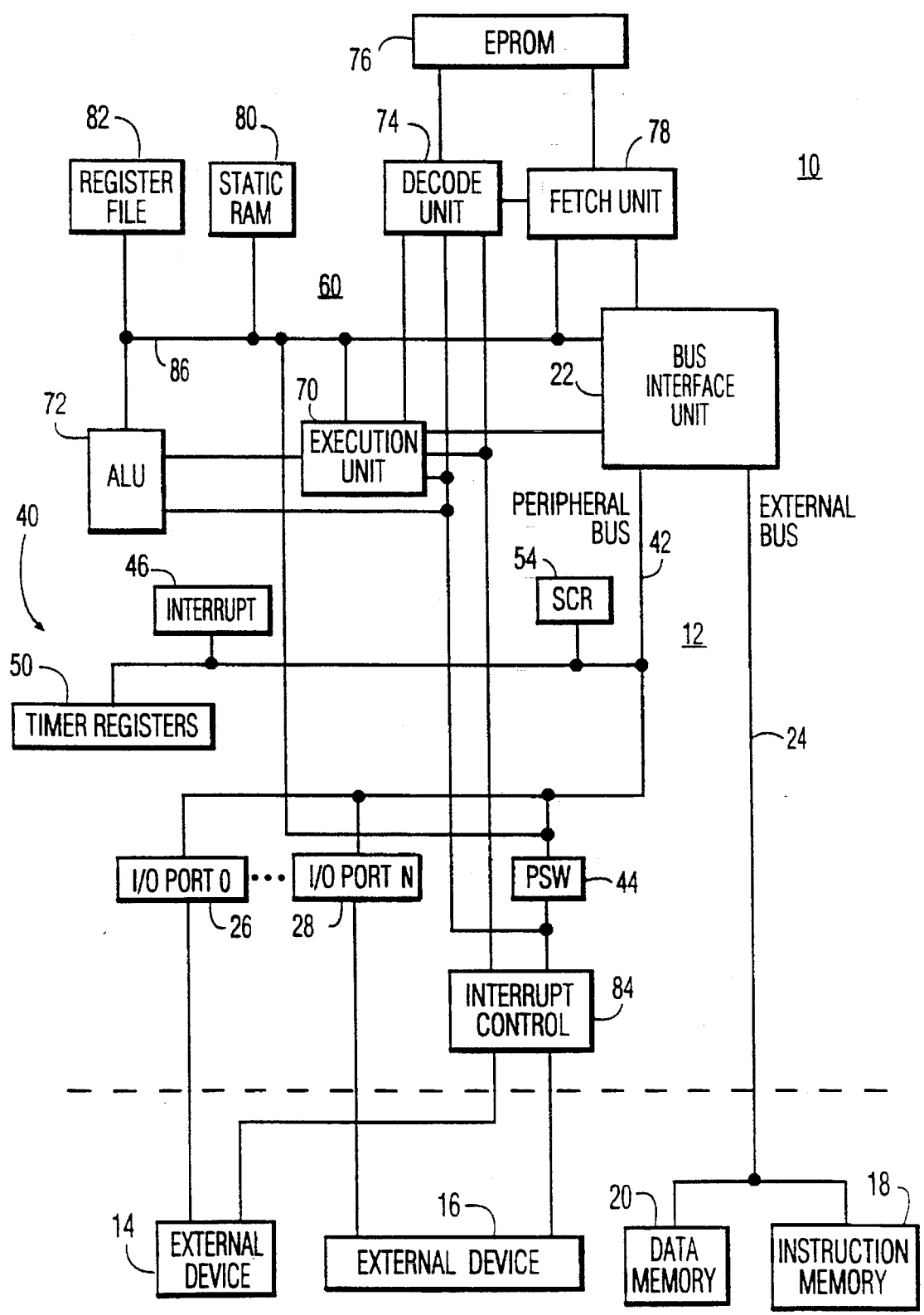
FIG. 1 depicts the components of one microcontroller or processor according to the present invention.

The architecture of the microcontroller system 10 of the present invention is illustrated in FIG. 1. This system 10 includes a single chip microcontroller 12 with separate internal instruction and data storage. The microcontroller 12 supports external devices 14 and 16 and, through 20/24 bit external address capability, supports sixteen megabytes of external instruction storage 18 and sixteen megabytes of external data storage 20. The microcontroller 12 includes a bus interface unit 22 which communicates with the external memories 18 and 20 over a 16 bit external bi-directional address and data bus 24 where the addresses are transferred in two cycles and a portion of the 20/24 bit address is latched in an external latch (not shown). The microcontroller 12 communicates with the external devices 14 and 16 through I/O ports 26–28 which are addressable as special function registers (SFR) 40. The ports 26–28, as well as other special function registers, are addressable over an internal peripheral bus 42 through the bus interface unit 22. The on-chip special function registers 40, some of which are bit addressable, also include a program status word (PSW) register 44 coupled to an interruption control unit 84 communicating with internal and external devices. The PSW register 44 is also connected to ALU 72, execution unit 70 and decode unit 74 for flag and general status control. The registers 40 also include an interrupt register 46, timer registers 50 and a system configuration register (SCR) 54 containing system configuration bits. The program status word register 44 is addressable over the peripheral bus 42 for general register operations and is also addressable over a connection to the internal bus 86 for other execution related operations. The bus interface unit 22 isolates the peripheral special function registers 40 from the microcontroller core 60. The core 60 includes a microcoded execution unit 70 which controls execution of instructions by means of an ALU 72 and the other units. The instructions decoded by a decode unit 74 are fetched from an internal EPROM 76, which is part of the instruction memory space, or from the external instruction memory 18 by a fetch unit 78. Static RAM 80, which is part of the data memory space, as well as general purpose registers of a register file 82 are also available for instruction and data storage.

Figure 2:
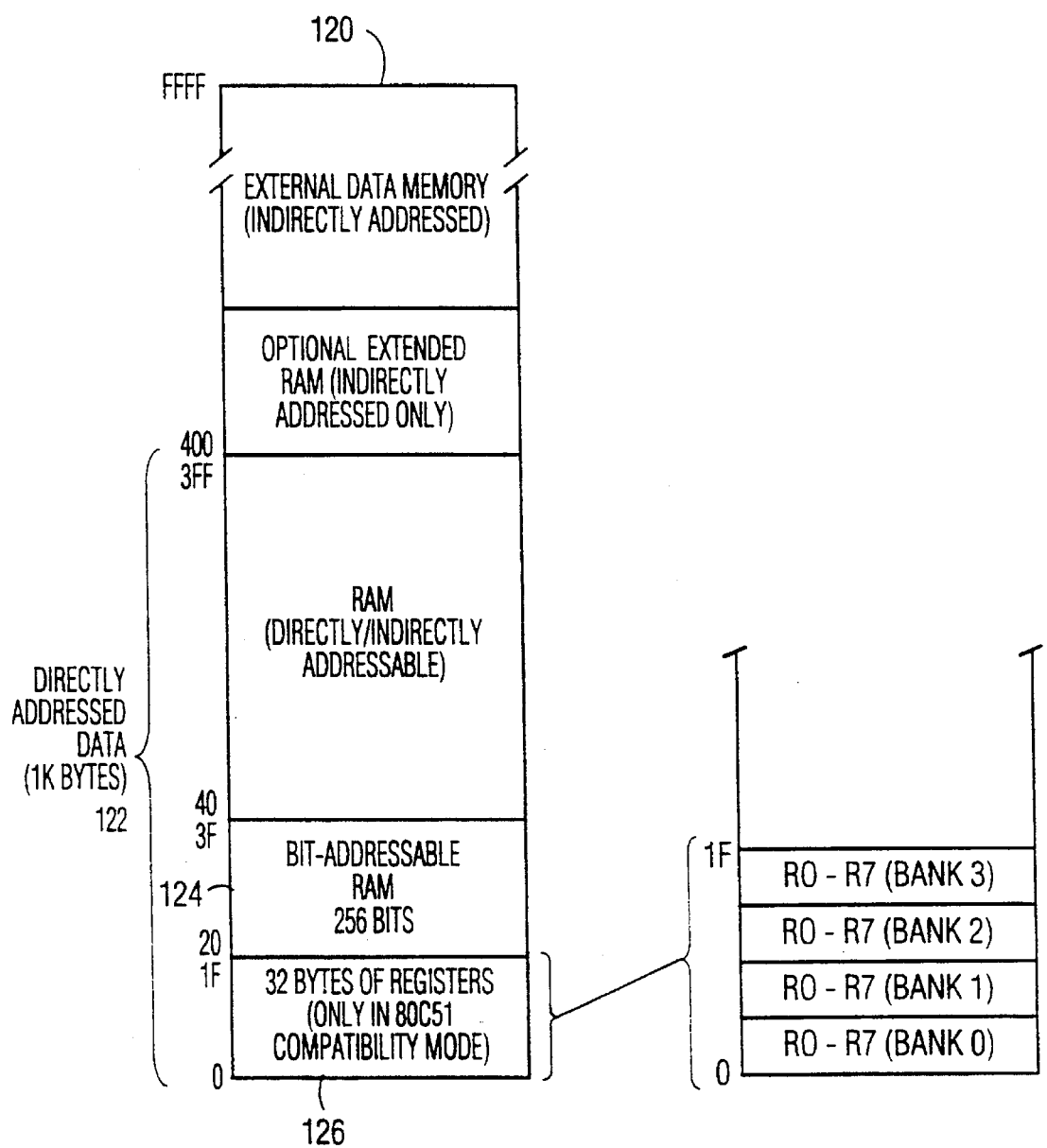
FIGS. 2 and 3 illustrate memory organization.
Figure 3:
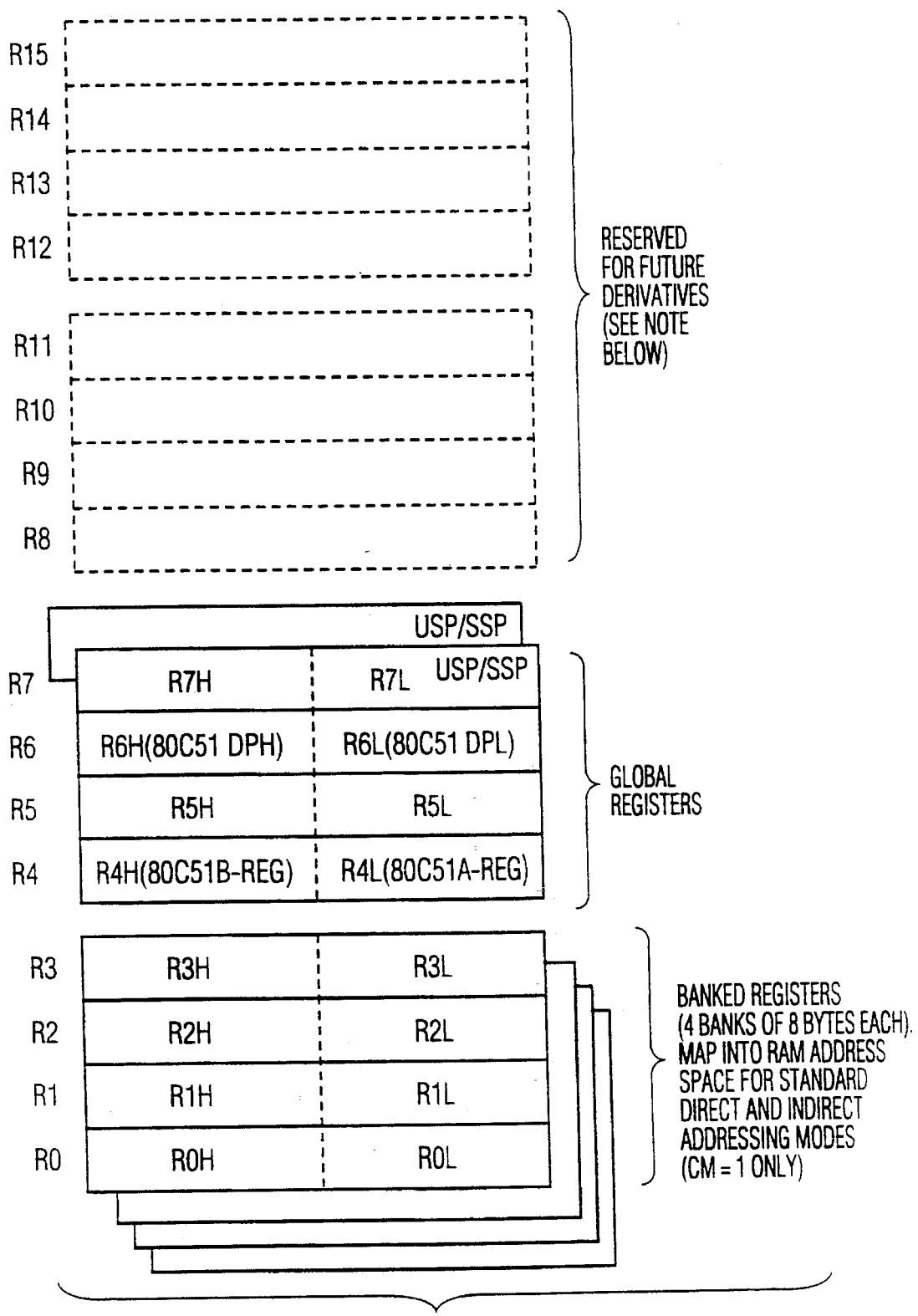

The microcontroller 12 includes a memory organization as illustrated in FIGS. 2 and 3 where FIG. 2 illustrates the organization into pages and FIG. 3 depicts the organization of a page in more detail. As previously discussed, the microcontroller 12 has separate address spaces for instruction memory and data memory. The logical separation of program and data memory allows concurrent access to both memories. The microcontroller 12 supports up to 16 megabytes of separate data and program memory (with 24-bit addresses). The data memory space 118 is segmented into 64K byte pages 120 as illustrated in FIG. 3. There are four banks of byte registers R0 through R7 (see FIG. 4) which are also mapped in data memory starting at address 0 in the on-chip RAM (in the register file 82) and going up to address 1F hexadecimal. One of the four banks is selected as the active bank by two bits in the PSW register 44. The selected bank appears as the general purpose registers.

Memory in the system 10 is addressed in units of bytes, each byte consisting of 8-bits. A word is a 16-bit value, consisting of two contiguous bytes. The storage order in the microcontroller 12 is "Little Endian" such that the lower byte of a word is stored at the lower address and the higher byte is stored at the next higher address. All 16-bit word addressable locations could be accessed as both bytes and words. The external bus 24 can be configured in 8 or 16-bit mode, selected during chip reset. Depending on the mode of operation selected, all 16-bit external accesses could be strictly words (16-bit mode) or bytes from consecutive memory locations (8-bit mode). An external word fetch in 8-bit mode results in 2 separate byte accesses (the result is the same in a single word access if the data is on-chip).

As previously stated, the microcontroller 12 supports a program memory 18 with an addressable space of 16 megabytes. The instruction set includes jumps and calls, some of which operate only on the local code space, some of which can access the entire program memory space, and some of which are register indirect. As discussed in more detail later, program memory target addresses referenced by jumps, calls, branches, traps and interrupts, under microcode program control, are word aligned. However, the return address from subroutines or interrupt handlers can be on either odd or even byte boundaries. For instance, a branch instruction may occur at any code address, but it may only branch to an even address. Branch address alignment provides two benefits: 1) branch ranges are doubled without providing an extra bit in the instruction, and 2) branched-to code executes faster if it is word aligned because the first two bytes of the instruction (a word) are fetched simultaneously.

Figure 4:
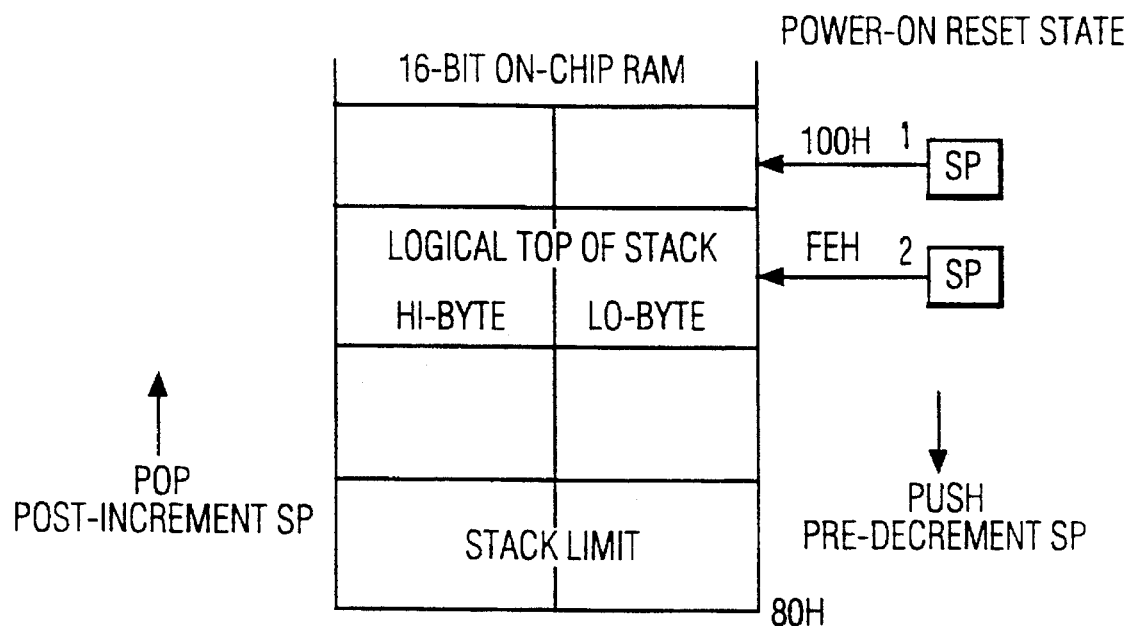
FIGS. 4 and 5 depict stacks.
Figure 5:
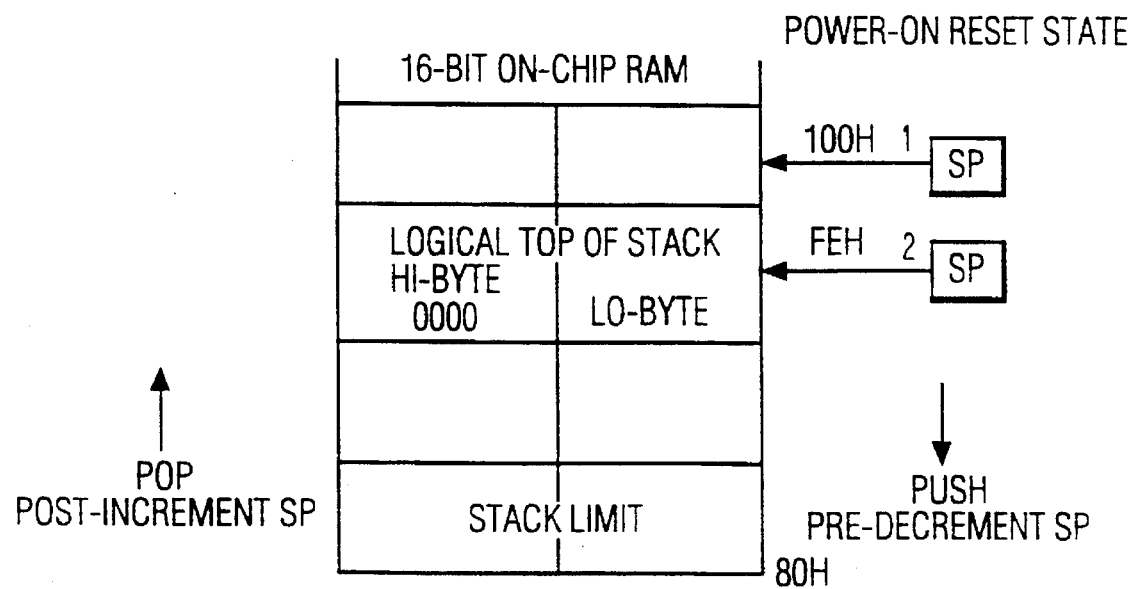

In the microcontroller 12 the stack as illustrated in FIGS. 4 and 5 grows downward from high to low addresses. The microcontroller 12 architecture supports a LIFO (last-in first-out) stack. At any given time, the stack pointer (SP) points to the last word pushed onto the stack. When new data is pushed, the stack pointer is decremented prior to writing to memory. When data is popped from the stack, the stack pointer is incremented after the data is read from memory. Since the microcontroller 12 stores data in the memory most significant bit (MSB) first, the stack pointer always points to the least significant bit (LSB) of a word written onto the stack. This matches the way a general purpose pointer accesses data from memory, so that the stack pointer may be copied to a general purpose pointer register and used to access parameters that reside on the stack.

Stack operations are facilitated by two stack pointers a user stack pointer (USP) and a system stack pointer (SSP) located in the registers of register file 82. The 16-bit stack pointers are customary top-of-stack pointers, addressing the uppermost datum on a push-down stack. It is referenced implicitly by PUSH and POP operations, subroutine calls, returns and trap/exception interrupt operations. The stack is always WORD aligned. Any PUSH to the stack (byte/word) decrements the stack pointer by two (SP=SP−2) and any POP (byte/word) increments the stack pointer by two (SP=SP+2). The stack alignment thus ensures that all stack operations are on word boundaries (even addresses), eliminating alignment issues and reducing the interrupt latency time as well as for other 16-bit or larger stack operations. Since SP is pre-decremented prior to a PUSH, a word-aligned stack would grow from FE downwards.

In multitasking systems one stack pointer is used for the supervisory system and another for the currently active task. This helps in the protection mechanism by providing isolation of system software from user applications. The two stack pointers also help to improve the performance of interrupts. The two stack pointers share the same register address. The stack pointer that will be used at any given time, and that will "appear" in the register file, is determined by the system mode bit (SM) in the program status word (PSW) register 44. In the user mode, all pushes, pops, and subroutine return addresses use the application or user stack. Interrupts, however, always use the system stack. As previously mentioned, there are eight 16-bit registers in the register file. Of those eight, one is reserved for the stack pointer (R7) and the other seven may be used as general purpose pointer registers to access the different segments of the memory. A "byte" register in the SFR space contains bits that are associated with each of the seven general purpose pointer registers (i.e. not the SP) that selects either DS or ES register as the source for the most significant 8-bit for the 24-bit address for indirect addressing modes. This register is called the segment select register.

Exceptions and interrupts are events that pre-empt normal instruction processing and are unplanned or unexpected/unscheduled changes in program flow. Each interrupt or exception has an assigned vector that points to an associated handler routine.

Exception and interrupt processing includes all operations required to transfer control to a handler routine, but does not include execution of the handler routine itself. An exception/interrupt vector includes the address of a routine that handles an exception. Exception/interrupt vectors are contained in a data structure called the vector table, which is located in the first 256 bytes of code memory page 0. All vectors consist of 2 words which are (i) the address of the exception handler with the procedure entry point located on a word boundary and (ii) the initial PSW contents for the handler. All exceptions and interrupts other than RESET cause the current program counter (PC) and PSW values to be stored on the stack and are serviced after the completion of the current instruction based on their priority level. During an exception or an interrupt, the entire 24-bit return address and the current PSW word are pushed onto the stack.

The stacked PC (hi-byte): PC (lo-word) value is the 24-bit address of the next instruction in the current instruction stream. The program counter (PC) is then loaded with the address of the corresponding handler routine from the vector table and the PSW is then loaded with a new value stored in the upper word of the corresponding vector. Execution of the exception or interrupt handler proceeds until the return from interrupt (RETI) instruction is encountered or by another exception or an interrupt of higher priority. The RETI instruction terminates each handler routine. Under microcode program control this pops the entire 24 bit return address from the stack into the PC, reloads the original PSW from the stack and causes the processor to resume execution of the interrupted routine.

There are several ways in which code or instruction addresses may be formed to execute instructions on the microcontroller 12. Scheduled or planned changes in the program flow are done with simple relative branches, long relative branches, 24-bit jumps and calls, 16-bit jumps and calls, and returns. Simple relative branches use an 8-bit signed displacement added to the program counter (PC) to generate the new code address. The calculation is accomplished by shifting the 8-bit relative displacement left by one bit (since it is a displacement to a word address), sign extending the result to 24-bits, adding it to the program counter contents, and forcing the least significant bit of the result to zero.

The long relative unconditional branch (JMP) and call with 16-bit relative displacements uses the same sequence. Far jumps and calls include a 24-bit absolute address in the instruction and simply replace the entire program counter contents with the new value. Return instructions obtain an address from the stack, which may be either 16 or 24-bits in length, depending on the type of return and the setting of a page zero mode bit in the SCR register. A 24-bit address will simply replace the entire program counter value. A 16-bit return address replaces only the bottom 16 bits of the PC in page zero mode, where the upper 8 bits of the PC are assumed 0. Code addresses can be generated by using a 16-bit value from a pointer register appended to either the top 8 bits of the program counter (PC) or the code segment (CS) register to form a 24-bit code address. The source for the upper 8 address bits is determined by the setting of the segment selection bit (0=PC and 1=CS) in the SSEL register that corresponds to the pointer register that is used. Note that the CS is an 8-bit SFR.

Figure 6:
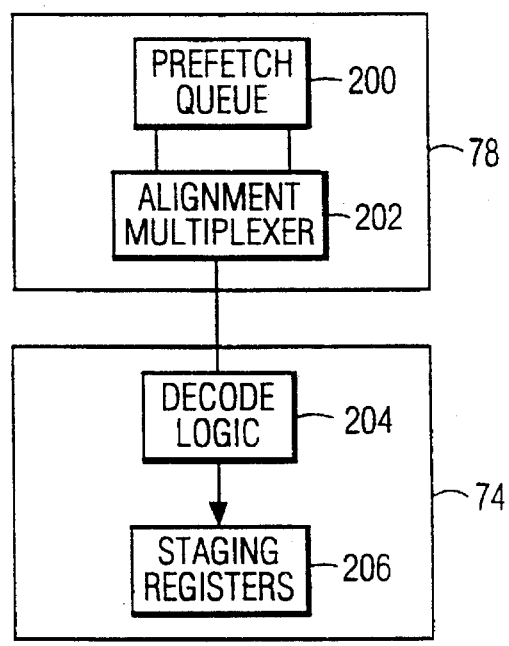
FIG. 6 depicts byte alignment in multibyte fetches.

The fetch operation that allows fetched instructions to be aligned either on a word or byte boundary is performed by a combination of a conventional non-aligned code fetch and conventional alignment circuits in the fetch unit 78 and the decode unit 74, as illustrated in FIG. 6. A conventional prefetch queue 200 receives words from code or instruction memory 76 or 18 and presents the words to a conventional alignment multiplexer 202. The multiplexer 202 selects the appropriate byte(s) to present to conventional decode logic 204 of the decode unit 74. The decode logic 204 decodes the instruction and presents the decoded instruction to the other units of the core, such as the execution unit 70, through conventional staging registers 206. In this way instructions can be byte aligned and be staged in their proper order.

Figure 7:
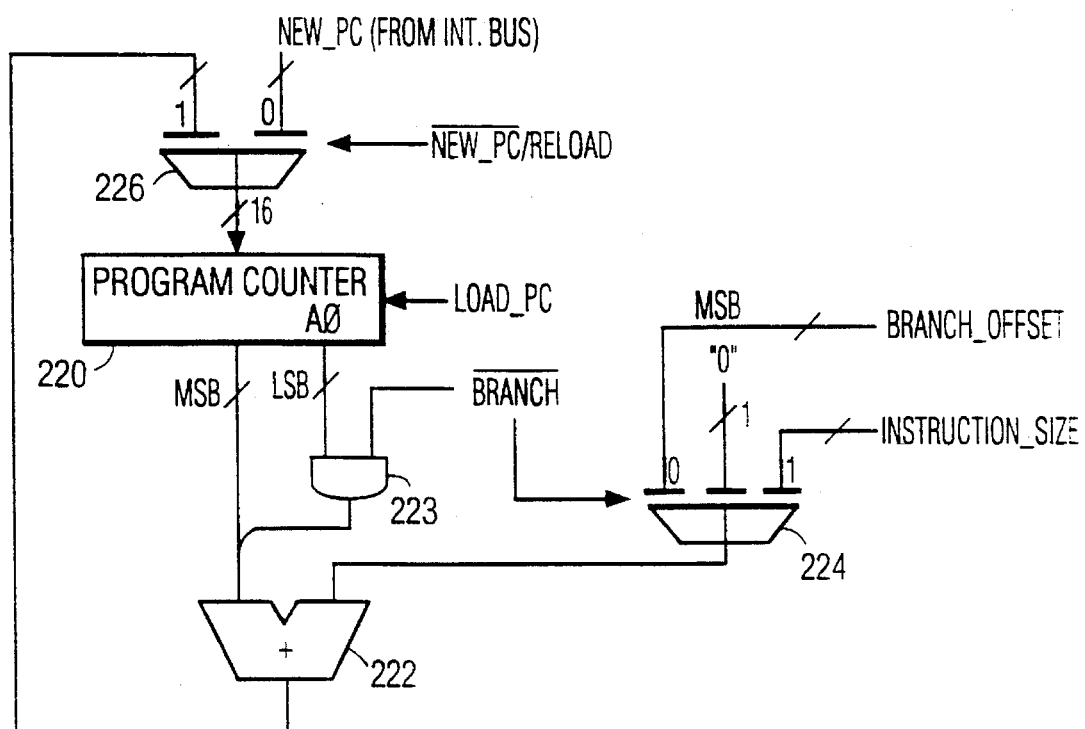
FIG. 7 depicts program counter modification during fetching.

To facilitate a flow transfer to a word aligned target during an unplanned program flow change and a return from the unplanned program flow change to a byte aligned return target, a program counter value in a program counter register 220 is adjusted using a circuit as illustrated in FIG. 7. During normal sequential instruction execution operations where program flow is sequential, after each instruction is executed the most significant bits (MSB) content of the program counter register 220 is provided directly to an adder 222. The least significant bit (LSB) is provided to the adder 22 through an AND gate 223 as long as there is not a branch being indicated by the staging registers 206. The adder 222 adds the instruction length, provided by the decoder staging registers 206 through a multiplexer 224, to the program counter value and the updated PC is stored back in the program counter register 220 through a multiplexer 226. When a scheduled flow change occurs, such as when a branch instruction jump, or call is presented by the staging registers 206, the AND gate 223 prevents the least significant bit from being presented to the adder 222. The multiplexer 224, instead of presenting the instruction length, presents the most significant bits (the word address) of the branch offset and a forced "0" in the least significant bit to the adder 222. The adder 222 adds the LSB augmented offset to the program counter value and this value is stored in the program counter register 220. When an unexpected change in flow occurs, such as in an exception or interrupt, then upon a return to the original flow, such as a return from an interrupt, the multiplexer 226 loads the program counter register 220 with the full return address from the internal bus 86 obtained, for example, from the stack in the case of an interrupt.

As previously mentioned the present invention requires that the transfer target addresses fall on a word boundary in some cases. A situation where a transfer target is not word aligned occurs when an instruction aligned on a word boundary has an odd number of bytes as shown below.

| Address | Instruction | | Size (Bytes) | Offset (bits) |
| --- | --- | --- | --- | --- |
| 0000 | | BNE L1 | 2 | |
| 0002 | | MOV.B (R0 + 1), R4 | 3 | 8 |
| 0005 | L1: | | | |

In this example the branch not equal instruction (BNE) occupies two bytes and the move instruction (MOV.B) is three bytes putting the next instruction of the branch target ("L1") at an odd byte address. An assembler or compiler can solve this problem and create or produce object code with word aligned jump target addresses in a number of different ways. In one approach in an assembler or compiler, when the symbol table is being built and a jump target is assigned a symbolic name in the symbol name table, the symbol table can be assigned to include a field indicating whether the final address must be aligned on a word boundary. When the jump target is encountered if the value of the location pointer or counter is not at a word boundary, that is, the least significant bit is not binary "0" or the location pointer contains an odd value, a single NOP instruction can be inserted at the location and the location pointer incremented to the next byte. This results in the next instruction and the symbol being word aligned, the value of the location is assigned to the symbolic name of the jump target and, as a result, the address assigned to the jump target is forced to the next word aligned location counter address as shown below.

| Address | Instruction | | Size (Bytes) | Offset (bits) |
| --- | --- | --- | --- | --- |
| 0000 | | BNE L1 | 2 | |
| 0002 | | MOV.B (R0 + 1), R4 | 3 | 8 |
| 0005 | | NOP | 1 | |
| 0006 | L1: | | | |

This solution results in a wasted instruction (NOP) that the execution unit must process. This wastes several clock cycles but may be acceptable in some cases, such as in the case where the extra NOP is inserted in loop parameter initialization and the aligned label is a loop entry which may be branched to many times. Another solution is to have the compiler scan the contiguous code and identify jump targets that are on byte boundaries and determine if any instruction prior to the target instruction can be expanded into an instruction that results in a word alignment for the target. If so, the instruction is expanded, if not, an NOP can be inserted. The expansion to force a word alignment is shown below.

| Address | Instruction | | Size (Bytes) | Offset (bits) |
| --- | --- | --- | --- | --- |
| 0000 | | BNE L1 | 2 | |
| 0002 | | MOV.B (R0 + 0001), R4 | 4 | 16 |
| 0006 | L1: | | | |

For this example an extra byte of all "0" is added to the relative offset. By using a compiler or assembler to produce code with jump targets at word boundaries, the penalty for a planned change in program flow in an unaligned code processor is minimized and overall processor throughput increases.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described. For example, the present invention can define byte, word and double-word using different number of bits; can be used in a system having differing numbers of registers, memory, etc.; and can be used when alignment is desired on a four byte boundary. Accordingly all suitable modifications and equivalents may be resorted to, falling within the scope of the invention.

What is claimed is:

1. A system, comprising:
   instruction means for aligning scheduled program flow change targets on word boundaries; and
   a processor, comprising:
   variable means for fetching variable size instructions alignable on byte boundaries and aligning the instructions for execution;
   flow change means for fetching the instructions at the flow change targets using a word boundary address;
   execution means for executing the fetched instructions; and
   transfer means for returning from unplanned program flow changes using byte aligned addresses.

2. A system as recited in claim 1, wherein said instruction means comprises a code generator performing instruction expansion and code manipulations to align transfer target addresses on word boundaries.

3. A system as recited on claim 1, wherein said variable means comprises:
   an instruction queue receiving byte aligned instructions; and
   an alignment multiplexer coupled to said queue and aligning the instructions for execution.

4. A system as recited in claim 1, wherein said flow change means comprises:
   a program counter register designating addresses of instructions fetched; and
   an instruction address modification unit coupled to said program counter register and modifying a program counter using a word-aligned address when loading a scheduled program flow change address and a byte-aligned address otherwise.

5. A system as recited in claim 1, wherein in said processor, an instruction boundary is smaller than a memory system fetch boundary.

6. A system as recited in claim 1, wherein a branch address is on a memory fetch boundary of the processor.

7. A system as recited in claim 1, further comprising means for return branching into any instruction.

8. A system as recited in claim 1, further comprising:

means for creating a symbol table which assigns a symbolic name for each jump target and a field indicating whether a final address must be aligned on a word boundary; and means for inserting a selected instruction when a jump target is encountered and a locator is not pointing to a word boundary.

9. A system as recited in claim 1, further comprising:

means for scanning contiguous code to identify jump targets on byte boundaries;

means for determining if any instruction prior to a target instruction can be expanded into an instruction that results in a word alignment for a respective target instruction; and means for expanding the instruction if any instruction is determined by said means for determining and for inserting a selected instruction if no instruction is determined.

10. A system, comprising:

a code generator performing instruction expansion and code manipulations to align transfer target addresses on word boundaries; and a processor, comprising:

an instruction queue receiving byte aligned instructions;

an alignment multiplexer coupled to said queue and aligning the instructions for execution;

a program counter register designating addresses of instructions fetched;

an instruction address modification unit coupled to said program counter register and modifying a program counter using a word-aligned address when loading a schedule program flow change address and using a byte-aligned address otherwise;

transfer means for returning from unplanned program flow changes using byte aligned addresses; and execution means for executing the fetched instructions.

11. A method of executing computer instructions, comprising the steps of:

a. aligning flow change target instructions on word boundaries;

b. aligning sequentially executable instructions on byte boundaries;

c. fetching and executing instructions using multiple byte fetching; and d. performing unplanned returns using byte aligned program transfer addresses.

* * * * *